United States Patent [19]
Nirei et al.

[11] Patent Number: 4,909,295
[45] Date of Patent: Mar. 20, 1990

[54] VEHICLE TIRE STRUCTURE

[75] Inventors: Toru Nirei; Hiroyuki Ikegami; Yuichi Yoshimura, all of Wako, Japan

[73] Assignee: Honda Giken Kogyo Kabushike Kaisha, Tokyo, Japan

[21] Appl. No.: 120,430

[22] Filed: Nov. 13, 1987

[30] Foreign Application Priority Data

Nov. 21, 1986 [JP] Japan .................. 61-278123

[51] Int. Cl.[4] ............................. B60C 17/04
[52] U.S. Cl. ...................... 152/333.1; 152/334.1; 152/340.1
[58] Field of Search ............... 152/333.1, 339.1, 340.1, 152/516, 518, 334.1, 316

[56] References Cited

U.S. PATENT DOCUMENTS

| | | | |
|---|---|---|---|
| 1,353,757 | 9/1920 | Jonassen | 152/316 |
| 1,472,986 | 11/1923 | MacKay | 152/316 |
| 2,070,066 | 2/1937 | Picardi | 152/331.1 |
| 2,780,266 | 2/1957 | McLeod | 152/340.1 |

FOREIGN PATENT DOCUMENTS 0020150 12/1980 European Pat. Off. ............ 152/518

Primary Examiner—David Simmons
Attorney, Agent, or Firm—Nixon & Vanderhye

[57] ABSTRACT

Disclosed is a vehicle tire structure in which a tubeless pneumatic tire is fitted over a wheel, characterized in that: at least a pair of walls project in substantially radial direction from an outer circumferential surface of the wheel into an annular chamber defined between the tire and the wheel. These walls prevents the generation of standing waves or the air column resonance inside the tire and contribute to the overall reduction of the road noise of the vehicle. The proximal ends of the walls may be either bonded to an annular member which surrounds the wheel or pivoted to a similar annular member and biased into radial or upright positions by a spring member, in such a manner as not to interfere with the replacement of the tire. Alternatively, the walls may consist of inflatable bags which may be inflated into upright positions and deflated into flat positions.

8 Claims, 2 Drawing Sheets

VEHICLE TIRE STRUCTURE

TECHNICAL FIELD

The present invention relates to an improved vehicle tire structure in which resonance of an air column in the tire is prevented for the purpose of reducing road noise.

BACKGROUND OF THE INVENTION

As engine noise and wind noise of automobiles are reduced as a result of continued efforts to reduce the overall noises of automobiles, the noise arising from the tires rolling over the road surface has presented itself as a major source of the running noise of the automobile. Tire noise is generated by collision between a tire tread and a road surface and it is possible to reduce the level of this noise to a certain extent by modifying the tread pattern. However, since an annular chamber is defined in a tire and this chamber functions as an air column having a resonance frequency of about 250 Hz in the case of a passenger car, the resulting resonance noise accounts for a major part of the overall noise and this noise is required to be reduced.

Such an air column resonance which can be considered as a sonic standing wave can be suppressed by dividing the air column with partition walls or filling the air column with material having a sound absorbing property, but since it means an addition to the mass of the tire and this addition of mass tends to be uneven along the circumferential direction the high speed performance of the tire tends to be impaired and such attempts have not been considered as practical. Japanese Utility Model Laid Open Publication No. 58-97005 discloses a tire having a plurality of partition walls integrally formed with the tire in the interior of the tire, but these partition walls are provided for the purpose of increasing the rigidity of the tire for agricultural machinery and it is not applicable to tires for high speed cruising.

BRIEF SUMMARY OF THE PRESENT INVENTION

In view of such problems of the prior art and recognition of the inventors, a primary object of the present invention is to provide a vehicle tire structure which can effectively prevent an air column resonance in the tire without impairing the performance of the tire.

Another object of the present invention is to provide a vehicle tire structure which can effectively prevent an air column resonance in the tire without interfering with the replacement of the tire.

According to the present invention, such an object is accomplished by providing a vehicle tire structure in which a tubeless pneumatic tire is fitted over a wheel, characterized in that: at least a pair of walls project in substantially radial direction from an outer circumferential surface of the wheel into an annular chamber defined between the tire and the wheel.

According to a certain aspect of the present invention, proximal ends of the walls are connected to an annular member which closely surrounds the outer circumferential surface of the wheel. The walls may be simply bonded to the annular member, or pivotally connected to the annular member with spring members biasing the walls into upright positions. Thus, the replacement of the tire can be accomplished without any undue difficulty. Alternatively, the walls may consist of inflatable bags.

The walls may be arranged at equal interval along the circumferential direction so as to minimize any unbalance in the wheel and tire assembly or may be arranged at unequal interval along the circumferential direction so as to suppress the generation of a standing wave with as few walls as possible.

BRIEF DESCRIPTION OF THE DRAWINGS

The present invention will now be shown and described in the following in terms of concrete embodiments thereof with reference to the appended drawings, in which.

DETAILED DESCRIPTION OF THE DRAWINGS

Figure 1:
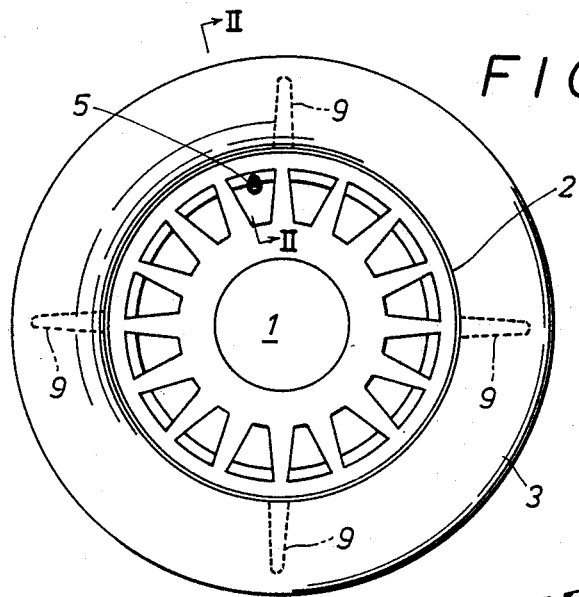
FIG. 1 is a side view of a wheel to which an embodiment of the present invention is applied.
Figure 2:
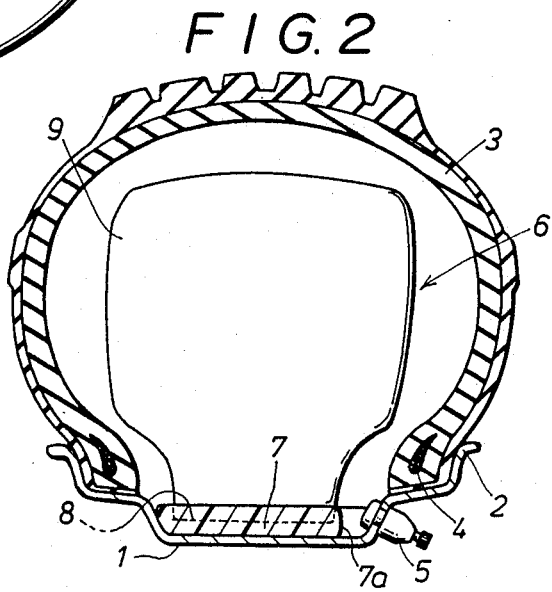
FIG. 2 is a sectional view taken along line II—II of FIG. 2.

FIGS. 1 and 2 show a first embodiment of the present invention in which beads 4 of a pneumatic tire 3 are engaged to the rims 2 of a wheel 1 made of steel or aluminum alloy and an annular chamber defined between the tire 3 and the wheel 1 is filled with compressed air. A valve 5 is fitted to the wheel 1 for filling this annular chamber with compressed air.

The outer circumferential surface of the wheel 1 is closely surrounded by an annular member 7 which may be made of, for instance, urethane resin formed in situ over the outer circumferential surface of the wheel 1. The outer circumferential surface of this annular member 7 is provided with a plurality (four in the case of the present embodiment) of axial grooves 8, for instance, at equal interval along the circumferential direction. Each of these grooves 8 receives a base end of a wall member 9 by way of a bonding agent for bonding these two members together. The annular member 7 is provided with a notch 7a as required for avoiding the interference with the valve 5. Therefore, in the present embodiment, a partition wall assembly 6 comprising the annular member 7 and a plurality of the wall members 9 is added to a conventional tire structure.

By thus forming partition walls inside the annular chamber defined in a tire, an air column resonance, for instance, having a basic frequency of 250 Hz can be prevented and the road noise can be significantly reduced. Further, by installing the tire 3 to the wheel 1 after only the annular member 7 is fitted around the wheel 1 and attaching the wall members 9 to the annular member 7 thereafter, the partition wall assembly 6 will not obstruct fitting of the tire 3 over the wheel 1. If required, the configuration of the wheel 1 can be modified for the purpose of facilitating the fitting of the tire 3.

Figure 3:
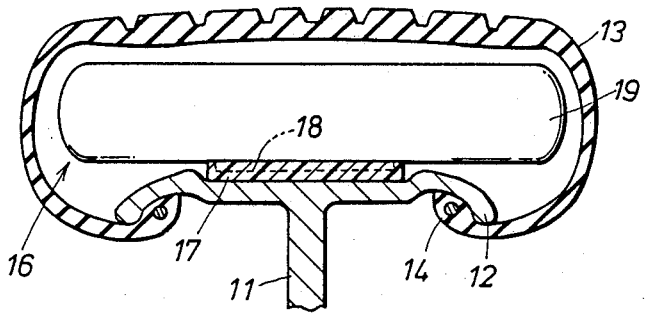
FIGS. 3 and 4 are views similar to FIG. 2 showing a second and a third embodiment of the present invention, respectively.

FIG. 3 shows a second embodiment of the present invention and those parts corresponding to those of the previous embodiments are denoted with like numerals and their detailed description is omitted.

Whereas in the previous embodiment the beads 4 of the tire 3 are fitted into the interior of the wheel rims 2, the beads 14 of the tire 13 are fitted over the external surfaces of the wheel rims 12 of a wheel 11 in the present embodiment. Therefore, in the present embodiment, fitting of the tire onto the wheel 12 is relatively simple and it is possible either to use a partition wall assembly consisting of an annular member 18 and a plurality of wall members 19 which are separate from the annular member 18 or to use a partition wall assembly consisting of an integral structure.

Figure 4:
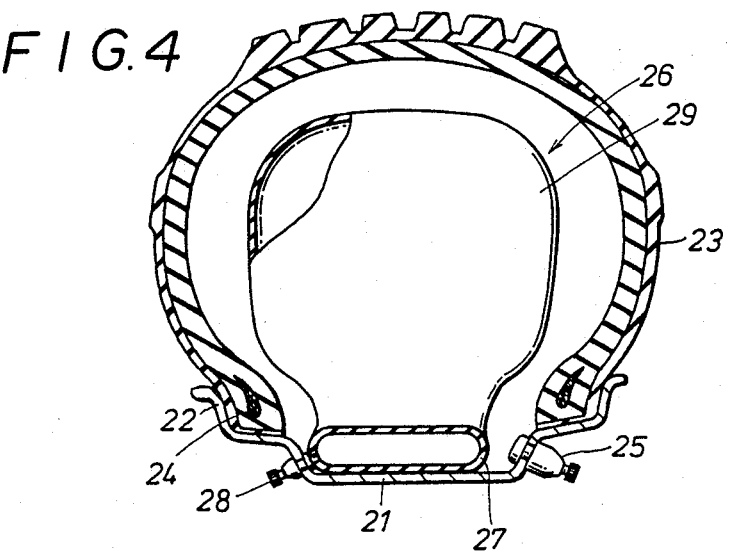

FIG. 4 shows a third embodiment of the present invention in which the partition wall assembly 26 consisting of a hollow rubber-like material having an annular portion 27 and wall portions 29 are used and the wall portions 29 are arranged at four locations at equal interval along the circumferential direction. An air valve 28 is passed through a part of the wheel 21 in an air-tight manner for the purpose of supplying compressed air into the partition wall assembly 26. In the present embodiment, this air valve 28 is placed as illustrated or alternatively, it could be on the same side as the air valve 25 but diagonally opposed thereto by 180 degrees for achieving an overall balance of the wheel.

In the present embodiment, by filling or removing compressed air into or out of the partition wall assembly 26, the work required for replacing the tire 23 is facilitated.

Figure 5:
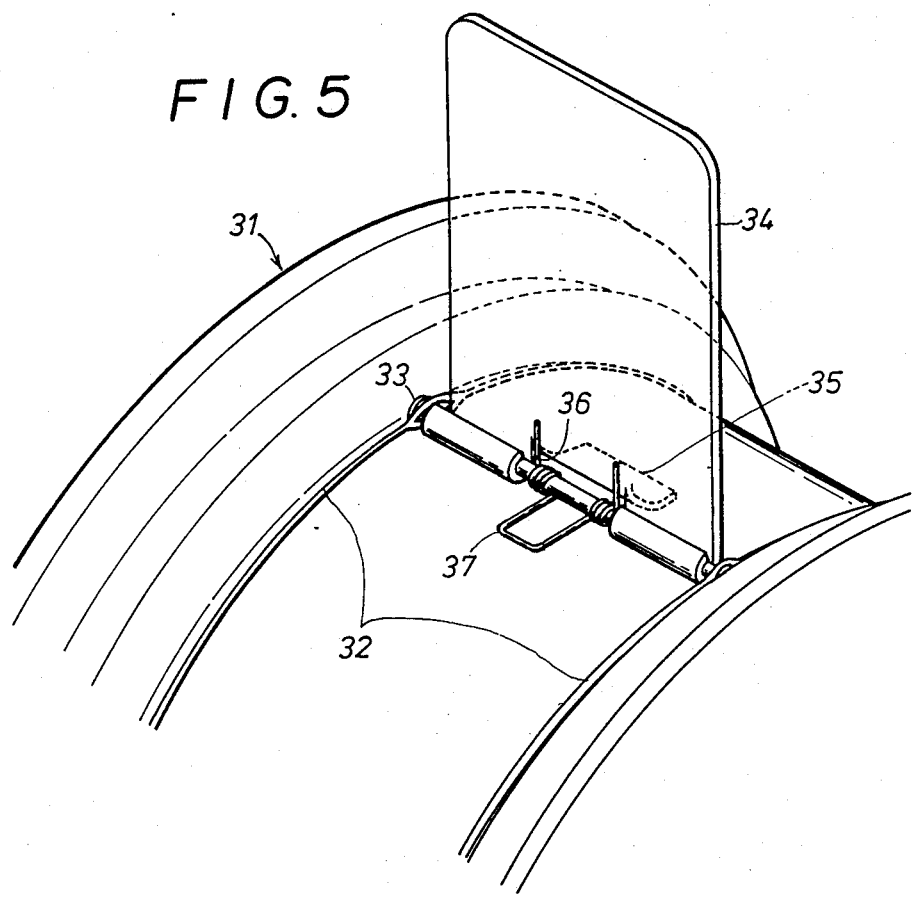
FIG. 5 is a sectional part view of a fourth embodiment of the present invention.

FIG. 5 shows a fourth embodiment of the present invention. In the present embodiment, a pair of steel wires 32 covered with rubber material are passed around the wheel 31 with a suitable means and four pivot shafts 33 are bridged across the steel wires 32, for instance, at equal interval along the circumferential direction. A wall member 34 is hinged at its both side ends of its base end to each of these pivot shafts 33 and is provided with an extension 35 extending in a perpendicular direction relative to the major surface of the wall member 34 at its base end in such a manner that the wall member 34 may be rotated between a position which is tangential to the wheel 31 and a position which is radial relative to the wheel 31.

Further, the base end of the wall member 34 is provided with a notch 36 so as to accommodate therein a torsion coil spring 37 which is wound around the pivot shaft 33 and biases the wall member 34 towards its radial position.

Thus according to the present embodiment, since the wall members 34 may be collapsed along the tangential directions of the wheel 31 and may be allowed to protrude in the radial directions under the spring force of the torsion coil springs 37 after the tire has been fitted onto the wheel 31, partition walls for preventing air column resonance can be provided without interfering with the replacement of the tire.

Thus, according to the present invention, since an air column resonance in a tire can be effectively prevented and the road noise of the wheel can be reduced without sacrificing the performance of the tire or the ease of fitting a tire onto a wheel, a significant advantage can be obtained in improving the riding comfort of the vehicle.

If the walls 9, 19, 29 and 34 are arranged unevenly, generation of a standing wave can be suppressed with a small number of walls because the nodes and antinodes of the air column resonance or the standing wave appear at equal interval along the circumferential direction and if the walls are arranged unevenly all of the walls will not coincide with the nodes of any low order resonance mode or standing wave.

Although the present invention has been shown and described with reference to the preferred embodiments thereof, it should not be considered as limited thereby. Various possible modifications and alterations could be conceived of by one skilled in the art to any particular embodiment, without departing from the scope of the invention.

What we claim is:

1. A vehicle tire structure comprising:
   a tubeless pneumatic tire;
   a wheel, over which said tubeless pneumatic tire is fitted, said wheel and tire defining an annular chamber therebetween;
   means for acoustically compartmentalizing said annular chamber in a circumferential direction of said annular chamber; and
   means for defining a space between said means for acoustically compartmentalizing and a radially outermost, inner surface of said tire, said structure having an axis of rotation wherein said means for acoustically compartmentalizing comprises:
   at least a pair of walls substantially parallel to said axis of rotation, said walls projecting in a substantially radial direction from an outer circumferential surface of the wheel into an annular chamber defined between the tire and the wheel.

2. A vehicle tire structure as defined in claim 1, wherein proximal ends of the walls are connected to an annular member which closely surrounds the outer circumferential surface of the wheel.

3. A vehicle tire structure as defined in claim 2, wherein at least the walls consist of inflatable bags.

4. A vehicle tire structure as defined in claim 2, wherein the proximal ends of the walls are fixedly bonded to the annular member.

5. A vehicle tire structure as defined in claim 1, wherein the walls are arranged at equal interval along the circumferential direction.

6. A vehicle tire structure as defined in claim 1, wherein the walls are arranged at unequal interval along the circumferential direction.

7. A vehicle tire structure comprising:
   a tubeless pneumatic tire;
   a wheel, over which said tubeless pneumatic tire is fitted, said wheel and tire defining an annular chamber therebetween;
   means for acoustically compartmentalizing said annular chamber in a circumferential direction of said annular chamber; and
   means for defining a space between said means for acoustically compartmentalizing and a radially outermost, inner surface of said tire, said structure having an axis of rotation wherein said means for acoustically compartmentalizing comprises:
   at lease a pair of walls substantially parallel to said axis of rotation, said walls projecting in a substantially radial direction from an outer circumferential surface of the wheel into an annular chamber defined between the tire and the wheel, and wherein proximal ends of the walls are connected to an annular member which closely surrounds the outer circumferential surface of the wheel, and wherein proximal ends of the walls are connected to an annular member which closely surrounds the outer circumferential surface of the wheel, the proximal ends of the walls are pivoted to the annular member and the walls are biased towards their radial positions.

8. A vehicle tire structure comprising:
   a tubeless pneumatic tire;

a wheel, over which said tubeless pneumatic tire is fitted, said wheel and tire defining an annular chamber therebetween;

means for acoustically compartmentalizing said annular chamber in a circumferential direction of said annular chamber; and means for defining a space between said means for acoustically compartmentalizing and a radially outermost, inner surface of said tire, wherein said means for acoustically compartmentalizing said annular chamber comprises:

at least a pair of walls, said walls having major surfaces and having free ends which project in substantially radial directions from an outer circumferential surface of said wheel into said annular chamber, said major surfaces of said walls extending substantially perpendicularly to a circumferential direction of said wheel.

* * * * *